Feb. 26, 1963  L. A. KOLZE  3,078,874
CONTROL FOR FLUID MIXING VALVE
Filed Nov. 10, 1958
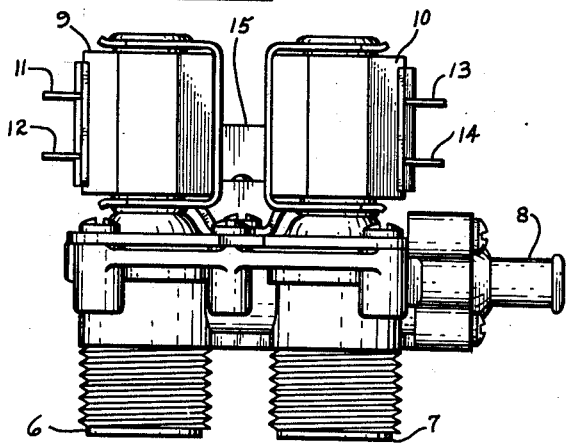
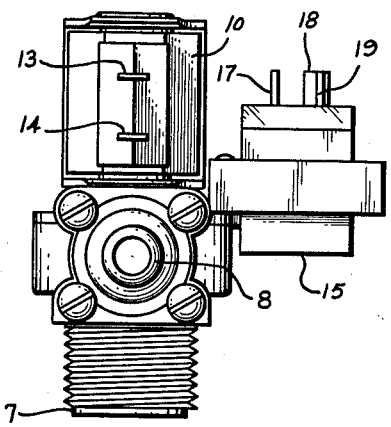
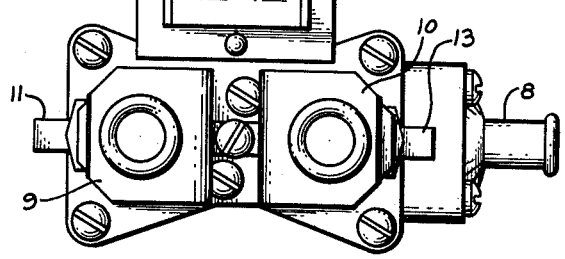
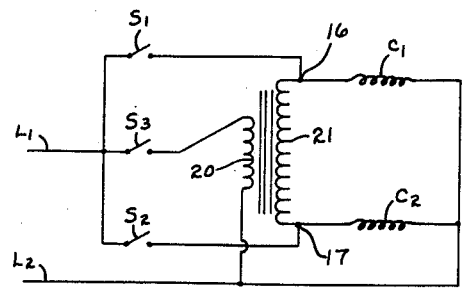
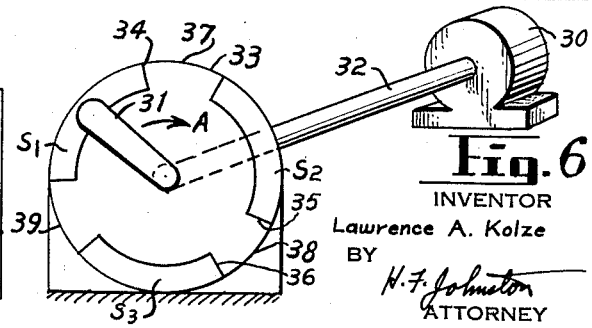
INVENTOR
Lawrence A. Kolze
BY
H. F. Johnston
ATTORNEY United States Patent Office 3,078,874
Patented Feb. 26, 1963

3,078,874
CONTROL FOR FLUID MIXING VALVE
Lawrence A. Kolze, Bensenville, Ill., assignor, by mesne assignments, to The Horton Company, Pittsburgh, Pa., a corporation of Pennsylvania
Filed Nov. 10, 1958, Ser. No. 772,923
7 Claims. (Cl. 137—624.18)

My invention relates to the control of fluid mixing valves, especially hot and cold water mixing valves for automatic washing machines.

In a large proportion of the automatic washing machines on the market today, a thermostatic mixing valve is provided in combination with three solenoid-controlled diaphragm valves. One solenoid controls the flow of only hot water bypassing the thermostat, a second solenoid controls only the flow of cold water bypassing the thermostat while the third solenoid controls the mixture as determined by the thermostat. Such machines are equipped with a sequence timer and wiring system or wiring harness for selectively opening and closing three switches which in turn directly control each of the three solenoids. It may be considered for purpose of this invention that such a sequence timer and wiring system is standard installation in automatic washing machines.

The purpose of my invention is to utilize in conjunction with such a standard timer and wiring system a much simpler, less costly and more dependable mixing valve. Such a valve may be termed a two-solenoid valve where hot water is obtained by energizing the first solenoid, cold water is obtained by energizing a second solenoid and warm water or a mixture of the two is obtained by energizing both solenoids. Examples of such two-solenoid valves are found in the patents to Smith 2,708,092 and to Stone 2,719,536.

My improved control system utilizes the first timer-controlled switch in the standard wiring system to energize the hot water solenoid, the second timer-controlled switch to energize the cold water solenoid and the third timer-controlled switch to energize both solenoids. This is accomplished by interposing suitable transformers connected between the two solenoids and the input to the transformer is controlled by the third switch. The transformer steps up the voltage to about double the line voltage so that the voltage across each solenoid coil will be substantially equivalent to the line voltage.

In the accompanying drawings, I have shown for the purpose of illustration a two-solenoid valve equipped with my improvement with diagrammatic illustrations of two types of transformers which may be employed.

In these drawings:

FIGURE 1 is a front elevation of one form of a two-solenoid valve;

FIGURE 2 is an end elevation of the valve showing the transformer attached;

FIGURE 3 is a plan view of the same;

FIGURES 4 and 5 are wiring diagrams showing alternate types of transformers that may be used;

FIGURE 6 is a perspective view of a sequence timer that may be usefully combined with my valve control.

Since the general construction of the two-solenoid valves is well-understood in the art, only a brief description of a typical one will be necessary.

The mixing valve shown has a hot water inlet 6, a cold water inlet 7 and a common outlet 8. A first solenoid 9 admits hot water to the interior of the valve body which communicates with the outlet 8 and likewise the second solenoid 10 serves to control the admission of cold water to the outlet 8. As well-known in the art, these solenoids when energized operate a pilot valve which controls the operation of a diaphragm for opening the main valve when the solenoid is energized. Connections to the solenoid 9 are made to the terminals 11 and 12 and connections to the solenoid 10 by similar terminals 13 and 14.

The transformer 15 may be attached in any suitable manner to the side of the valve body and it has terminals 16 and 17 leading from the output side and connected by suitable leads 18 and 19 respectively to the first and second solenoids. The input terminals for the transformer are indicated at 18 and 19 and in the case of the transformer shown in FIGURE 5, only one of these input terminals will be utilized.

FIGURE 6 shows a sequence timer or valve actuation scheduling device having a synchronous motor or other suitable timing means 30 to provide a predetermined timing motion. A rotating switch arm or rotor 31 is driven by the motor 30 through a shaft 32 in a direction indicated by the arrow A. The rotor 31 is at least partly constructed of an electrically conductive material that is arranged to contact a disc or switch plate 33. A plurality of electrically conductive strips 34, 35, and 36 are spaced around the circumference of the switch plate 33 to be sequentially engaged in an electrical current flow conducting relationship with the rotor 31 as it is driven by the motor 30. The plurality of strips 34, 35, and 36 may be separated by non-conductive spaces 37, 38, and 39 to provide a non-actuating period or dwell in the scheduled sequence.

The sequence timer shown in FIGURE 6 may be readily employed to provide the three sequentially operated switches S–1, S–2, and S–3 of the circuits shown in FIGURES 4 and 5, merely by connecting suitable electrical conduits or wires to the electrically conductive strips 34, 35, and 36 and to the electrically conductive portion of rotor 31.

The manner in which my improved control means function will be best understood from the wiring diagrams. In the case of FIGURE 4, when the sequence timer calls for hot water, switch S–1 is closed to energize to coil C–1 directly from the power lines L–1 and L–2. Similarly, when the timer calls for cold water, switch S–2 will be closed and energizes coils C–2 directly from the power line. When the timer calls for warm water, switch S–3 will close and will allow current to flow to the input coil 20 of the transformer directly from the power supply lines L–1 and L–2. The output coil 21 may have twice the number of turns of the input coil 20 and since the coils C–1 and C–2 are parellel between the transformer and line L–2, each will be supplied with half of the output voltage which will be substantially the same as the line voltage. Thus, by closing of one switch S–3, both solenoids are energized to supply mixed or warm water.

It will be understood that when switch S–3 is opened and either S–1 or S–2 closed, the impedance of the coil 21 will be great enough to prevent any substantial flow of current such as would energize the opposite coil on the closing of either switch S–1 or S–2.

In FIGURE 5 I have illustrated how an autotransformer may be used instead of the more conventional transformer of FIGURE 4. In this case, the operation is substantially the same upon the closing of either of the switches. The switch S–3 has a connection to about the middle of the transformer coil 22 so that current is supplied to each of the coils at substantially the line voltage when switch S–3 is closed. As is well-understood, this is due to the fact that when the switch S–3 is closed, the fields of the coil on each side of the input connection are bucking each other so that current flow is resisted only by the small D.C. resistance of the coil. However, the high impedance of the coil when switch S–1 or S–2 is actuated will prevent any substantial flow of current.

It will thus be seen that my invention provides a means whereby a two-solenoid valve with the addition of an inexpensive transformer may supplant the relatively more expensive and troublesome three-solenoid thermostatic valves in machines equipped with a timer and wiring harness for operating three switches.

What is claimed:

1. In combination, a first electric power supply line, first, second, and third switch means electrically connected in series with said first power line and in parallel with each other, a second electric power supply line, a pair of solenoids electrically connected in parallel with each other and in series with said second power line, electrical conductor means connecting said first switch means in series with said first solenoid, further electrical conductor means connecting said second switch means in series with said second solenoid; and transformer means operatively connecting said third switch means in series with both said first and second solenoids to apply a voltage which is substantially equal to the voltage of said first power line with respect to said second power line, to both of said first and second solenoids upon closure of said third switch means, while substantially preventing a voltage from being applied to said second solenoid upon closure of said first switch means and to said first solenoid upon closure of said second switch means respectively, whereby closure of said first switch means actuates said first solenoid, closure of said second switch means actuates said second solenoid, and closure of said third switch means actuates both said first and second solenoids.

2. An electrical control system comprising, a first electrical power supply line, a second electrical power supply line, first, second and third switches, a first solenoid, a second solenoid, and a transformer, said transformer having first and second windings, said second winding containing a greater number of turns than said first winding, a first electrical circuit including in series: said first power line, said first switch, said first solenoid, and said second power line; a second electrical circuit including in series: said first power line, said second switch, said second solenoid, and said second power line; a third electrical circuit including in series: said first power line, said third switch, said first winding of said transformer, and said second power line; and a fourth electrical circuit formed by connecting the second winding of said transformer between a point in said first circuit between said first switch and said first solenoid, and a point in said second circuit between said second switch and said second solenoid, whereby, closure of said first switch will energize said first solenoid, closure of said second switch will energize said second solenoid, and closure of said third switch will energize both of said first and second solenoids.

3. A control system as defined in claim 2 further including means for sequentially actuating said first, second, and third switches in a predetermined timed relationship.

4. A control system as defined in claim 2 wherein, said second transformer winding contains twice as many turns as the first transformer winding, whereby, said first and second solenoids will receive substantially the same voltage whether energized separately by said first or second switches, respectively, or simultaneously by said third switch.

5. In combination, a hot and cold water mixing valve having a first valve member for selectively allowing and preventing a flow of hot water and a second valve member for selectively allowing and preventing a flow of cold water, and a control means therefor; said control means comprising: a first electrical power supply line, a second electrical power supply line, first, second and third switches, a first solenoid, a second solenoid, and a transformer, said transformer having first and second windings, said second winding containing a greater number of turns than said first winding, a first electrical circuit including in series: said first power line, said first switch, said first solenoid, and said second power line; a second electrical circuit including in series: said first power line, said second switch, said second solenoid, and said second power line; a third electrical circuit including in series: said first power line, said third switch, first winding of said transformer, and said second power line; and a fourth electrical circuit formed by connecting said second winding of said transformer between a point in said first circuit between said first switch and said first solenoid, and a point in said second circuit between said second switch and said second solenoid, whereby closure of said first switch will energize said first solenoid to operate said first valve, closure of said second switch will energize said second solenoid to operate said second valve, and closure of said third switch will energize both said first and second solenoids to operate both of said first and second valves.

6. A hot and cold water mixing valve as defined in claim 5 further including means for sequentially actuating said first, second and third switches in a predetermined timed relation.

7. A hot and cold water mixing valve having a first valve member for selectively admitting and preventing a flow of hot water, first electrically energizable means for actuating said first valve member, a second valve member for selectively admitting and preventing a flow of cold water, second electrically energizable actuating means for actuating said second valve member, electrical circuit means including a first switch and said first actuating means for energizing said first actuating means in response to operation of said first switch, electrical circuit means including a second switch and said second actuating means for energizing said second actuating means in response to operation of said second switch, and an electrical circuit including both said first and second actuating means and a third switch that is independent of said first and second switches for energizing both said first and second actuating means simultaneously in response to operation of said third switch.

References Cited in the file of this patent
UNITED STATES PATENTS

| | | |
|---|---|---|
| 2,296,266 | Breckenridge | Sept. 22, 1942 |
| 2,503,901 | Chace | Apr. 11, 1950 |
| 2,695,976 | Hasenkamp | Nov. 30, 1954 |
| 2,801,372 | Renick | July 30, 1957 |
| 2,980,140 | McMillan | Apr. 18, 1961 |